Figure 1:
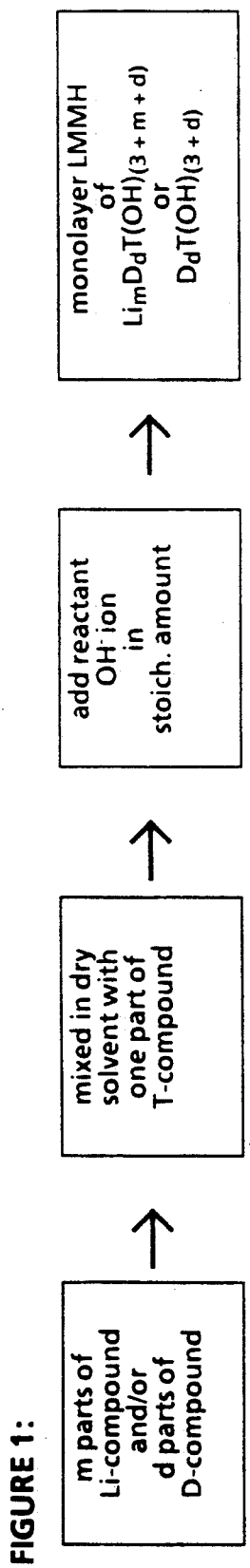

United States Patent [19]

Burba, III et al.

[11] Patent Number: 5,084,209

[45] Date of Patent: * Jan. 28, 1992

[54] LAYERED MIXED METAL HYDROXIDES MADE IN NON-AQUEOUS MEDIA

[75] Inventors: John L. Burba, III, Lake Jackson; Steve A. Sims, Angleton, both of Tex.; Thomas M. Knobel, Hackensack, N.J.

[73] Assignee: The Dow Chemical Company, Midland, Mich.

[*] Notice: The portion of the term of this patent subsequent to Feb. 5, 2008 has been disclaimed.

[21] Appl. No.: 609,966

[22] Filed: Nov. 6, 1990

[51] Int. Cl.$^5$ .............................................. B01J 13/00
[52] U.S. Cl. ........................... 252/315.5; 252/315.01; 252/323; 507/140
[58] Field of Search .................. 252/315.01, 323, 318, 252/8.514, 315.5

[56] References Cited

U.S. PATENT DOCUMENTS

| | | | |
|---|---|---|---|
| 3,631,083 | 12/1971 | Hartmann | 260/448 |
| 4,511,710 | 4/1985 | Wang et al. | 528/485 |
| 4,664,843 | 5/1987 | Burba, III et al. | 252/315.5 |
| 4,773,936 | 9/1988 | Clark et al. | 106/402 |
| 4,790,954 | 12/1988 | Burba, III et al. | 252/315.5 |
| 4,812,245 | 3/1989 | Burba, III et al. | 252/17 |
| 4,970,191 | 11/1990 | Schultz | 502/341 |
| 4,980,047 | 12/1990 | McCauley | 208/112 |
| 4,990,268 | 2/1991 | Burba, III et al. | 252/8.514 |

FOREIGN PATENT DOCUMENTS

207811A3 7/1985 European Pat. Off. .

Primary Examiner—Robert L. Stoll
Assistant Examiner—N. Bhat
Attorney, Agent, or Firm—W. J. Lee

[57] ABSTRACT

Crystalline layered mixed metal hydroxides (LMMHs) which are substantially free of unbound water and which conform substantially to the general formula $$Li_m D_d T(OH)_{(3+m+d)},$$

where
m represents an amount of Li of from 0 to 3,
D represents a divalent metal cation, and d represents an amount of D of from 0 to 8.0,
T represents a trivalent metal cation, and (3+m+d) represents an amount which substantially satisfies the valence requirements of Li, D and T, and
where m+d does not equal zero, are prepared, in an organic reaction medium which is essentially free of unbound water, by mixing predetermined metal organo compounds in predetermined ratios and reacting the metal organo compounds with at least one reagent which supplies OH$^-$ ions to replace the beginning anions in the mixture of metal compounds.

A preferred LMMH is one which conforms substantially to the generic formula Mg$_d$Al(OH)$_{(3+d)}$, where d represents the amount of Mg per each unit of Al. Useful anhydrous gels are among the useful products.

23 Claims, 1 Drawing Sheet

LAYERED MIXED METAL HYDROXIDES MADE IN NON-AQUEOUS MEDIA

FIELD OF THE INVENTION

Crystalline layered mixed metal hydroxides (LMMHs) are prepared in non-aqueous media from metal-organo compounds.

CROSS-REFERENCE TO RELATED APPLICATION

This application contains subject matter related to that in pending application Ser. No. 07/060,133 filed June 9, 1987, now U.S. Pat. No. 4,990,268 which is a continuation application under 37 C.F.R. 1.60 of abandoned application Ser. No. 06/752,325 filed July 5, 1985, which itself is the priority document for EPO patent 0.207.811 A3 published Jan. 7, 1987, all of which are incorporated herein by reference.

BACKGROUND OF THE INVENTION

Crystalline layered mixed metal hydroxides (LMMHs) of the monolayer variety have been made in aqueous systems, employing water-soluble reactants (esp. $MgCl_2$ and $AlCl_3$), such as in EPO 0.207.811 and U.S Pat. No. 4,790,954. Mixed metal hydroxides of the 2-layer and 3-layer variety have also been made in water systems, such as in, e.g., U.S. Pat. No. 4,812,245. Some of the layered mixed metal hydroxides that have been prepared in aqueous media have been ion-exchanged with ionizable organic compounds to provide organic anions in the compounds, such as in U.S. Pat. No. 4,727,167.

We have now found, unexpectedly, that significantly different properties are advantageously found in crystalline layered mixed metal hydroxides (LMMHs) that have been prepared using non-aqueous material as the reaction media in creating the LMMHs, thus obtaining LMMHs which are substantially anhydrous. This lack of water permits the LMMHs to be used n applications in which the presence of water is detrimental, such as in electrorheological fluids which may be employed under conditions which exceed the boiling point of water; or as additives to polymers; or as additives in oil-based paints or coatings where the presence of more than a very minor amount of water is detrimental.

SUMMARY OF THE INVENTION

It is within the purview of the present invention that substantially crystalline layered mixed metal hydroxides (LMMHs) are prepared using non-aqueous, essentially anhydrous reaction media as solvents for the reactant metal compounds. The reactant metal compounds are "metal-compounds" wherein the anions attached to the metal atoms are organic, illustrated here as (OR), where R is an organic moiety. The LMMHs formed by reacting with stoichiometric amounts of added $H_2O$ to replace the (OR) groups with (OH) groups in the non-aqueous media conform substantially to the generic formula:

anhydrous $Li_mD_dT(OH)_{(3+m+d)}$, where

Li is a monovalent lithium cation, and m represents an amount of Li of from 0 to about 1, D represents a divalent metal cation, and d represents an amount of D of from 0 to about 8.0, T represents a unit quantity of trivalent metal cation, and $(3+m+d)$ represents an amount of hydroxyl ion which substantially satisfies the valence requirements of Li, D, and T, and the sum of $m+d$ does not equal zero.

Preferably, the LMMH substantially conforms to the formula $Mg_dAl(OH)_{(3+d)}$ where, when the amount of Al is taken at unity, d is a numerical value in the range of about 0.5 to about 4, and the crystal structure is of the monolayer, monodispered variety which is obtained by co-precipitation, in an organic medium, as hydroxides of a mixture of a Mg organo compound and an Al organo compound. These forms of hydroxides are also sometimes called hydrated oxides, or hydrous oxides even though they are part of a crystal structure comprising mixed metals. In these structures, there is virtually no excess water of hydration, in contrast to similar compounds of the prior art when prepared in aqueous media using metal salts wherein the salt groups are water soluble inorganic materials.

Gels of these anhydrous LMMH compounds in organic media are very useful, especially as thickening additives to other organic liquids. Instead of having water clinging to the surface of the crystals, the present invention beneficially provides dry crystals with non-aqueous material coating the crystals; this is useful in obtaining compositions of the crystals as a disperse phase in a non-aqueous continuous phase as a useful composition product. However, if the non-aqueous coating on the crystals is volatile enough to be removed without using temperatures high enough to destroy the layered crystal structures, or is easily washed off with a lower boiling non-aqueous material which can be easily evaporated, one can obtain crystals having little or no coating.

BRIEF DESCRIPTION OF FIG. 1-3

Figure 2:
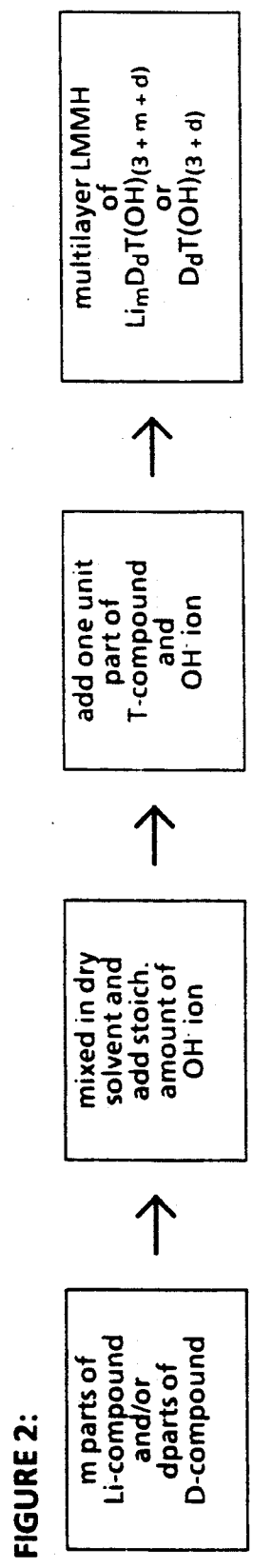
Figure 3:
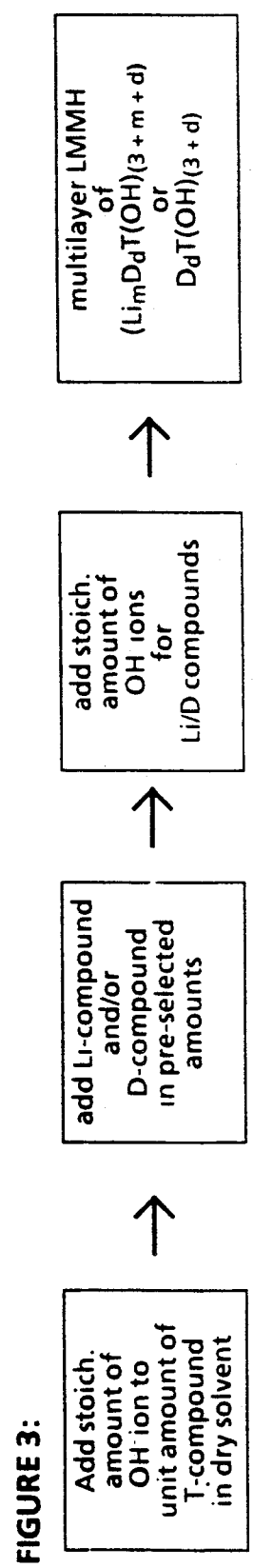

FIGS. 1-3 are visual aids which briefly demonstrates the main differences in process steps between the three illustrated reaction processes.

In general, the process comprises either:

FIG. 1 illustrates mixing a Li-organo compound and/or D-organo compound (especially a D-organo compound) with a T-organo compound in pre-selected ratios in a solvent which is non-aqueous, and reacting the dissolved mixture of metal compounds with a pre-selected amount of hydroxyl ion, OH−, source (especially $H_2O$) whereby the OH− ion replaces at least a substantial portion of the anionic moiety of the metal organo compounds in the mixture and the reaction product (LMMH) substantially forms as a crystalline monolayer, monodispersed coprecipitate of hydroxides having crystal thicknesses in the range of about 0.8 to about 1.6 nm (about 8 to about 16 angstroms (A°)), or FIG. 2 illustrates dissolving a Li-organo compound and/or D-organo compound in a substantially anhydrous non-aqueous solvent, with an amount of hydroxyl ion source (especially $H_2O$) sufficient to convert at least a substantial amount of the dissolved metal-organo compound(s) to corresponding hydroxide(s), then adding a pre-determined amount of T-organo compound to that, which may tend to form some equilibration or metathetical reaction products with the previously formed hydroxides, and then reacting that with a sufficient amount of hydroxyl ion source (especially $H_2O$) predetermined to convert the T-organo compound to hydroxide, thereby precipitating LMMHs which are heterodispersed, multilayered crystals of mixed metal hydroxides, substantially of the 2-layer or 3-layer variety, though some monolayer variety can present, or FIG. 3 illustrates dissolving a T-organo compound in a non-aqueous solvent, adding to that an amount of hydroxyl ion source (especially H₂O) sufficient to convert at least a substantial amount of the T-organo compound to T-hydroxide, then adding pre-determined amounts of Li-organo compound and/or D-organo compound to that, which may tend to form some equilibration or metathetical products with the previously formed T-hydroxide, and then adding to that a sufficient amount of hydroxyl ion source (especially H₂O) predetermined to convert the Li-organo compound and/or D-organo compound to hydroxides, thereby precipitating LMMHs which are heterodispersed, multilayered crystals of mixed metal hydroxides, mostly of the 2-layer or 3-layer variety, though some monolayer variety can be present.

It should be understood that these mixed metal hydroxides are layered crystals which each contain the mixed metals in the crystal structure, in contradistinction to physical mixtures of individual metal hydroxides.

DETAILED DESCRIPTIONS INCLUDING BEST MODE KNOWN

The D metal can be an alkaline earth metal, especially Mg or Ca, preferably Mg, or can be Mn, Fe, Co, Ni, Cu, Zn, or mixtures of these. The T metal can be any of Al, Ga, Cr, or Fe, preferably Al or Fe, most preferably Al.

The following descriptions are directed to the preferred Li, D, and T, metals, and most especially to Mg and Al as the D and T metals.

In the above formulae, when taking the quanity of T metal at unity, m may be from zero to about 1, usually about 0.5 to about 0.75, when not zero: d may be from zero to about 8 or more, preferably about 0.5 to about 6 and most preferably about 0.5 to about 4. However, m+d is never zero.

The anions which can be associated with the metal of the formula Li(OR) or D(OR)$_2$ or T(OR)$_3$ may be hydrophilic organic anions of alcohols (preferably) or from other organic compounds which form a metal-oxygen bond with the Li, D, and T metals, such as alkanoic acids (for instance acetic acid, stearic acid, and the like), glycolate, polycarboxylate, or polyacrylates.

Within the purview of the present inventive concept is the use of Mg compounds and Al compounds which react with a hydroxyl compound, especially H₂O, replacing the anions of the metal compounds with OH⁻ anions and forming side products with the anions which are being removed from the metal cations. Metal compounds such as MgXR, MgR$_2$, AlR$_3$, AlXR$_2$, AlX$_2$R, where X represents a halide or other inorganic anion and R represents an organic moiety, are examples of compounds which form hydroxides when reacted with water. The solvents for these organometallic compounds should be those which, themselves, do not react with the organometallic compounds; this can be anhydrous alkyls or aryls, such as hexane, octane, dodecane, purified gasoline, purified kerosene, toluene, benzene, and the like. If placed in a solvent which, itself, has groups or impurities which react with the organometallic compounds, the desired coprecipitation as the hydroxides is likely to be impaired or prevented. The addition of small amounts of water as a reactant should be done slowly, even though the organometallic compounds are normally dissolved only in small percentages in the anhydrous solvents. The reaction of the organometallic compounds with water is likely to be more exothermic than those in which metal alkoxides are used.

When the beginning reactant metal compounds are the preferred metal alkoxides, especially Mg alkoxides and Al alkoxides, it is preferred that the reaction medium be the alcohol which corresponds to the alkoxide anion on the metal cation. That is, if the alkoxide anion is ethoxide, then it is preferred to use ethanol as the medium: if the alkoxide is propoxide, then propanol is preferred as the medium, and so on through the range of alkoxides. If one metal alkoxide has a different alkoxide group than that of another metal alkoxide, it is preferred to use as the medium the alkanol which is found to dissolve the greatest amount of the least soluble metal alkoxdes. This is easily determined by testing the solvency of the compounds. However, reaction media other than alcohol, such as hydrocarbon solvents (esp. alkanes and isoalkanes), aromatics (such as benzene, toluene, xylene), and other aprotic liquids such a N-methyl pyrrolidone, tetrahydrofuran, and methylene chloride may be employed. Mixtures of such liquids are within the purview of the present inventive concept.

An alkoxide-based LMMH of the present invention may be prepared, e.g., from equimolar amounts of Mg(alkoxy)$_2$ and Al(alkoxy)$_3$, where the alkoxy anion is represented by $(-OC_nH_{2n+1})$, where n can be an amount of from 1 to 20 or more, preferably 1 to 8, to produce crystalline LMMH of formula MgAl(OH)$_5$, which can also be written as Mg(OH)$_2$Al(OH)$_3$, by dissolving the starting materials in a suitable solvent, e.g. an alcohol, and adding to that an amount of H₂O sufficient to provide the requisite amount of OH⁻ anions to satisfy the requirements of the metal cations. The cationic H+ ion of the H₂O combines with the alkoxy anion (RO−) which is released from the metal to form alcohol (ROH). Other OH⁻ sources can be used, e.g., a hydrated material that will slowly release its waters of hydration for reaction with the metal-alkoxy compounds, but which material does not itself attach to the metal. Also, OH⁻ ions of one compound (R'OH) can undergo metathesis with a metal alkoxide (MOR) as illustrated by:

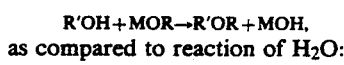

as compared to reaction of H₂O:

The reaction is relatively slow, as compared to the aqueous reaction of soluble inorganic metal salts with OH⁻ ions, and the total yield is limited by the extent of solubility of the metal compounds in alcohol or other non-aqueous carriers in which the reaction is carried out. As a general rule, a metal alkoxide is most soluble in its corresponding alcohol. However, solubility is only of the order of about 1 wt.% in most cases with the notable exception of magnesium ethoxide in ethanol which has greater solubility.

At the outset, the preparation of the alkoxide-based LMMHs should be conducted in an environment which is essentially free of water until the introduction of sufficient water required by the reaction (described above) since the starting metal alkoxides are hygroscopic, and can react to separately form hydroxide, carbonate and alcohol before the LMMH can be formed. Consequently, the use of nitrogen-purged, moisture-free apparatus is recommended during the initial mixing of the beginning metal alkoxides. Other inert water-free gasses besides nitrogen can be used in the purging of the reactor.

In general, the metal alkoxides in powder form are blended together and then added to dry alcohol in the approximate weight ratio of alkoxide:alcohol of, e.g., 1:50. This mixture is stirred while heating, say, to about 50° C. to obtain a solution which may still contain some undissolved solids. These solids may be separated by vacuum filtration: if permitted to remain they can form reaction side products which are not part of the desired LMMH crystals (though there are instances in which such side-products can be tolerated). The filtrate is then treated with about two drops (0.06g) of deionized water for each 1 g of alkoxide while stirring. The filtrate obtained may be allowed to stand, e.g., from about 1 hour to about 48 hours. About 40–50% of the solvent is then evaporated, for instance, by flowing nitrogen to produce an LMMH-containing gel. In some instances a gel may form prior to the evaporation step, in which case this step may be eliminated.

In a more specific, preferred embodiment the above procedure can be followed using magnesium ethoxide and aluminum ethoxide combined in methanol.

LMMHs may be prepared to obtain a relatively narrow distribution of particle sizes. This can be significant, e.g., in an electrorheological fluid (ERF) where the electrorheological effect is believed to be proportional to both surface charge and the surface to mass ratio or aspect ratio. High aspect ratios have been found to be desirable in ERFs, and LMMHs have high aspect ratios, generally ranging from about 30 to about 1000 or more, with aspect ratios in the range of about 600 to about 650 being readily obtained.

To demonstrate effectiveness in an ERF, an alkoxide gel is prepared by mixing magnesium ethoxide and aluminum ethoxide in dry methanol under moisture-free conditions with subsequent controlled water addition to produce an alkoxide-based LMMH gel. This provides a $MgAl(OH)_5$ compound, as described before, which is quite viscuous at room temperature even though the concentration of the LMMH is only 1 wt.%. An ERF is prepared by admixing about 45 g of the LMMH gel containing 1% LMMH with about 139 g of anhydrous methanol. This produces a composition containing about 0.45 g LMMH or about 2450 ppm by weight. Upon application of an electric field, the ERF reacts instantly by forming an extremely high viscosity gel. Upon removal of the electric field the ERF immediately returns to its previous viscosity.

Further examples are given below for various embodiments, but the invention is not limited to the particular embodiments shown.

EXAMPLE 1

In a nitrogen-purged dry box, 2 parts by weight of $Mg(OC_2H_5)_2$ and 1 part by weight of $Al(OC_2H_5)_3$ are mixed together for 1 hour at room temperature in 100 parts of dry diethylene glycol. The mixture is somewhat cloudy, so it is heated to 60°–65° C. and stirred for 2 more hours to assure maximum dissolution of the metal compounds. Upon filtering the still warm solution, only a trace of insolubles are recovered indicating that nearly all the solids are dissolved and the solution after filtration is only slightly cloudy. A net of 94.1 parts of slightly cloudy filtrate is reacted with 1.58 parts deionized water (a stoichiometric amount for the reaction) by slow addition with good mixing. During the water addition, which causes formation of the metal hydroxides, a thickening or the onset of gellation is apparent. After 2 hours the mixture is thick and slightly cloudy. After standing overnight partial gellation is apparent. After 2 more days of standing a very good gel forms which analyses as 1.43% $Mg_xAl_y(OH)_z$ with mol/kg Mg=0.164, mol/kg Al=0.061, and Mg/Al ratio=2.68.

EXAMPLE 2

In a nitrogen-purged dry box, mix together 1 part by weight of solid powdery magnesium diethoxide, $Mg(C_2H_5O)_2$, and 1 part by weight of solid powdery aluminum triethoxide, $Al(C_2H_5O)_3$, add 104 parts of dry methanol, mix well for about 5 minutes, and warm to about 50° C. while mixing. Upon filtering out, drying, and weighing undissolved solids, it is found that about 0.62 parts by weight is not dissolved in the warmed methanol. To the methanol solution add 0.1 part by weight of deionized water and mix well. Filter the slightly cloudy mixture to obtain clear filtrate. Allow the filtrate, pH 10, to stand in the dry box overnight. Upon standing for several hours in the lab outside the dry box the filtrate, pH 10, is gelled to a clear gel, $MgAl(OH)_5$. Analyses show monodispersed, monolayer crystals having crystals of thicknesses in the range of about 8 angstroms to about 16 angstroms and an aspect ratio averaging about 600.

EXAMPLE 3

In a nitrogen-purged dry box, mix 1 part by weight of $Mg(OC_2H_5)_2$ and 1 part by weight of $Al(OC_2H_5)_3$ as dry powders, then mix into 98 parts by weight of dry methanol, mix well with stirring to 50° C., filter through filter paper to obtain a filtrate which is slightly cloudy: recover about 0.98 parts of dry insolubles. To the filtrate add 0.12 parts of deionized water with stirring for 10 minutes, refilter through filter paper to clarify, allow filtrate to stand over the weekend in the dry box.

Upon removal from the dry box the sample is divided into halves. Air is blown over one sample for several minutes to evaporate some of methanol and reduce sample volume by about 40–50%; this sample gells during standing for a few hours. To the second sample is added 0.24 parts of more deionized water and after similar 40–50% evaporation a clear gel is formed.

The presence of crystalline layered mixed metal hdroxides (LMMH) comprising magnesium aluminum hydroxides is indicated by transmission electron microscopy which shows thin hexagonal platelets approximately 4000–5000 angstroms (A°) across and about 8 to 16 angstroms thick: this is a specific characteristic of these monolayered mixed metal magnesium aluminum hydroxides.

These LMMHs, derived from metal compounds which have organic anion moieties, rather than inorganic anion moieties, are found to have viscosification activity in drilling mud formulations which compare well with that obtained with LMMHs produced from metal halides, such as $MgCl_2$ and $AlCl_3$ as disclosed in U.S Pat. No. 4,790,954. Furthermore, these LMMHs, being free of unbound water, are readily dispersed in anhydrous carriers for use in situations where the presence of water would be detrimental.

EXAMPLE 4

In preparing an LMMH without using filtration during the process, 1 part by weight of magnesium ethoxide and 1 part by weight of aluminum ethoxide (a Mg/Al mole ratio of about 1.42) are well-mixed in powder form in a $N_2$ purged dry box. The mixture is added to about 98 parts by weight of dry methanol to produce 100 parts by weight of mixture and stirred for 30 minutes. It is cloudy and contains undissolved solids.

The mixture is removed from the dry box, exposed to air, while stirring, for about 2 hours at room temperature. The mixture is returned in a capped container to the dry box and stirred an additional 4 hours at room temperture during which time nearly all solids dissolve. The mixture is allowed to stand at room temperature over the weekend and a slightly cloudy gel is formed, which, by analysis is found to have a Mg/Al ratio of about 1.4, indicating the formula $Mg(OH)_{2.8}Al(OH)_3$, which can be written as $MgAl(OH)_{5.8}$, and the amount of LMMH in the methanol is about 0.62 percent by weight.

It appears that allowing the mixture to absorb moisture from the air provides enough water in the methanol to help carry the reaction substantially to completion, but excessive exposure to the humidity in the air should be avoided.

EXAMPLE 5

In a nitrogen-purged dry box 1 part by weight of magnesium ethoxide powder is dissolved in 49 parts by weight of dry methanol; after mixing for 15 minutes almost all solid is dissolved. In another container, 1 part by weight of aluminum ethoxide powder is dissolved in 49 parts by weight of methanol; after stirring for about an hour most of the solid is dissolved.

The two mixtures are combined in one container, removed from the dry box and stirred for 1 hour while exposed to air. The container is closed and stirred for 3 more hours. During the stirring of the open containers, there is some evaporation of the methanol and a slight pick-up of moisture from the air. A cloudy mixture which forms is filtered through filter paper to clarify the mixture and there is recovered about 86.34 parts by weight of clear filtrate and 0.18 parts by weight of dry solids on the filter paper.

The filtrate is allowed to stand overnight before adding about 0.78 parts by weight of deionized water, followed by good mixing and standing overnight. The following day another 0.78 parts by weight of deionized water is added with good mixing. After about 45 minutes a clear colorless gel forms which analyses as having a Mg/Al ratio of 1.21 and about 0.9 percent by weight of LMMH content, of the formula $Mg(OH)_{2.42}.Al(OH)_3$, or $MgAl(OH)_{5.42}$, of the monolayer variety.

A 20.25 part by weight sample of the gelled filtrate, when dried at 110° C. to a constant weight, yields about 0.178 parts by weight of yellowish solid.

Reactions such as above are successfully used to produce LMMH gels using Mg:Al ratios of 0.5, 0.98, 1.21, 1.31, 1.41, 2.32, 2.64, 3.32, 3.95, and 7.26. When preparing the monolayered, monodispersed version of the crystals, one should use a Mg:Al ratio in the range of about 0.5 to about 4 to substantially avoid any extraneous phases. When making the multi-layered heterodispersed versions, one is not restricted to the same range as with the monolayered monodispersed version and the presence of the extraneous phases is more acceptable, though not preferred. Due to the different solubilities of metal alkoxides in different solvents it is advantageous to prepare separate solutions of, for example, aluminum ethoxide and magnesium ethoxide, filter each solution to remove undissolved solids, and analyze to determine actual dissolved metal alkoxide. These solutions are then blended in proportions designed to yield LMMH with specific Mg:Al ratios. This technique also allows water to be added stiochiometrically, avoiding the inclusion of excessive amounts water.

What is claimed is:

1. A substantially crystalline, layered mixed metal hydroxide (LMMH) conforming substantially to the generic formula

$Li_mD_dT(OH)_{(3+m+d)}$, where
m represents an amount of Li of from 0 to 1,
D represents at least one divalent metal cation of the group consisting of Mg, Ca, Mn, Fe, Co, Ni, Cu, and Zn, and d represents an amount of D of from 0 to 8.0,
T represents a unit amount of at least one trivalent metal cation selected from the group consisting of Al, Fe, and Cr, and (3+m+d) represents an amount of OH− ions which substantially satisfied the valence requirements of Li, D, and T, and where
m+d does not equal zero,
said LMMH crystals being of the monolayered, monodispersed variety or the multilayered, heterodispersed variety,
and being substantially anhydrous.

2. The LMMH of claim 1 wherein it is of the monodispersed monolayer variety, the crystals of which have a thickness in the range of about 8 to about 16 angstroms, and an aspect ratio in the range of about 30 to about 1000 and the ratio of D:T is in the range of about 0.5 to about 4 and m is zero.

3. The LMMH of claim 1 wherein it is of the heterodispersed multilayer variety.

4. The LMMH of claim 1 wherein it is of the monolayered, monodispersed variety of the formula $Mg_dAl(OH)_{(3+d)}$ where d is an amount in the range of about 0.5 to about 4.

5. The LMMH of claim 1 wherein it is of the monolayer monodispersed variety of the formula $Mg_2Al(OH)_5$.and the crystals bear a coating of dry, non-aqueous material.

6. The LMMH of claim 1 wherein it is present in an organic, water-free solvent or carrier in an amount which produces a gel in the absence of shearing forces.

7. The LMMH of claim 1 wherein the crystals bear a coating of dry, non-aqueous material.

8. A composition comprising an organic, water-free fluid having dispersed therein a crystalline LMMH of claim 1.

9. The composition of claim 8 wherein the crystalline LMMH is of the monodispersed, monolayer variety of the formula $Mg_dAl(OH)_{(3+d)}$, where d is an amount in the range of about 0.5 to about 4.

10. The process which comprises mixing together, under substantially anhydrous conditions, at least one reactant compound of the formula $M(OR)_2$ and at least one reactant compound of the formula $T(OR')_3$, providing a substantially dry organic medium in which the reactants are well mixed and carried,
wherein M is a divalent metal cation of the group of metals consisting of Mg, Ca, Mn, Fe, Co, Ni, Cu, and Zn, and T is a trivalent cation of the group of metals consisting of Al, Fe, and Cr, and wherein R and R', which can be alike or different, each represent an organic moiety of a compound having an oxygen atom ionically or covalently bound to an M or T metal, said organic medium being a carrier for the reactant compounds which dissolves at least an appreciable portion of the reactant compounds at a temperature below the boiling point of the medium, adding to the medium containing the well mixed reactants an amount of water predetermined to react substantially stoichiometrically with the reactants whereby the metals are simultaneously converted to their hydroxides which co-precipitate, and where the so-formed mixed metal hydroxides are substantially in the form of anhydrous crystalline layered mixed metal hydroxides of the formula $M(OH)_d T(OH)_3$ or $M_d T(OH)_{(3+d)}$, where d is an amount in the range of about 0.5 to about 8.

11. The process of claim 10 wherein the amount of carrier is selected at, or adjusted to, an amount at which the mixture, upon standing, forms a gel.

12. The gel which is formed in accordance with claim 11.

13. The process of claim 10 wherein the M is Mg and the T is Al.

14. The process of claim 10 wherein the crystalline mixed metal hydroxide formed is $Mg_d Al(OH)_{(3+d)}$, where d is an amount in the range of about 0.5 to about 4.

15. The process of claim 10 wherein the crystalline mixed metal hydroxide formed is $MgAl(OH)_3$.

16. The process of claim 10 wherein the crystalline mixed metal hydroxide crystals are recovered from the reaction medium bearing a coating of a dry nonaqueous material.

17. The process of claim 10 wherein the mixed metal hydroxide formed is of the multi-layered, heterodispersed variety.

18. The process of claim 10 wherein the mixed metal hydroxide formed in of the monolayered, monodispersed variety and where the amount of d is in the range of about 0.5 to about 4.

19. A gel comprising a continuous phase of a substantially dry non-aqueous liquid having dispersed therein, as a gellant, a layered crystalline anhydrous mixed metal hydroxide of the formula $$Li_m D_d Al(OH)_{(3+m+d)},$$

where
m is an amount in the range of zero to about 1,
d is an amount in the range of about zero to about 8 of at least one divalent metal D selected from the group consisting of Mg, Ca, Mn, Co, Ni, Fe, Cu, and Zn,
T is a unit amount of trivalent metal selected from the group consisting of Al, Fe, and Cr, and
where m+d is at least about 0.5 and not more than about 8.

20. The gel of claim 19 wherein the mixed metal hydroxide is of the multi-layered, heterodispersed variety.

21. The gel of claim 19 wherein the mixed metal hydroxide is of the monolayered monodispersed variety, and wherein m+d is not less than about 0.5 nor more than about 4.

22. The gel of claim 19 wherein the mixed metal hydroxide is monolayered, monodispersed $Mg_d Al(OH)_{(3+d)}$, where d is not less than about 0.5 nor more than about 4.

23. The gel of claim 19 wherein the mixed metal hydroxide is monolayered, monodispersed $MgAl(OH)_5$.

* * * * *